(No Model.)

N. NELSON.
BRAKE LEVER BOLT.

No. 582,793. Patented May 18, 1897.

Witnesses
J. H. Shumway
Ellen Scarborough

Nels Nelson
Inventor
By attys Earle Seymour

UNITED STATES PATENT OFFICE.

NELS NELSON, OF NEW HAVEN, CONNECTICUT.

BRAKE-LEVER BOLT.

SPECIFICATION forming part of Letters Patent No. 582,793, dated May 18, 1897.

Application filed March 29, 1897. Serial No. 629,654. (No model.)

*To all whom it may concern:*

Be it known that I, NELS NELSON, of New Haven, in the county of New Haven and State of Connecticut, have invented a new Improvement in Brake-Lever Bolts; and I do hereby declare the following, when taken in connection with the accompanying drawings and the letters of reference marked thereon, to be a full, clear, and exact description of the same, and which said drawings constitute part of this specification, and represent, in—

Figure 1:
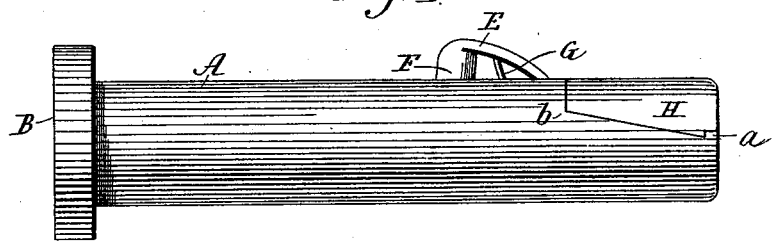
Figure 2:
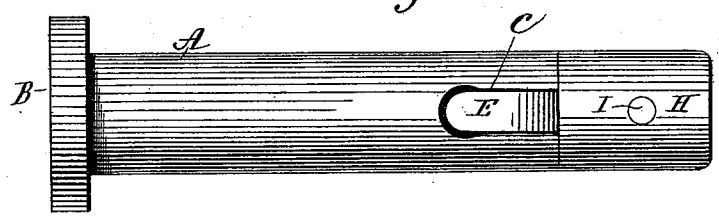
Figure 3:
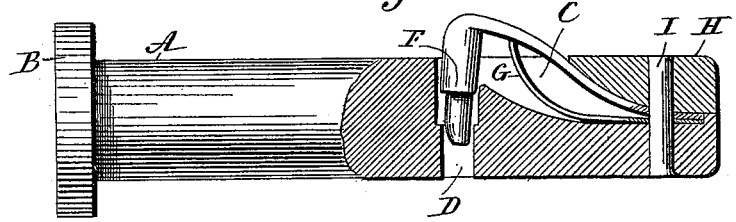

Figure 1, a side view of a bolt constructed in accordance with my invention; Fig. 2, a top view of the same; Fig. 3, a side view in partial section.

This invention relates to an improvement in brake-lever bolts such as are used in connecting the various parts of brake mechanism of railway-cars. As usually employed, these bolts are straight pins of suitable diameter, formed at one end with a flat head and near the outer end or in proper position with relation to the place in which the bolt is to be used with a transverse opening, through which a cotter-pin is inserted for securing the said bolts in position. Under the strain to which these parts are placed and the constant jolting particularly incidental to freight-cars these cotter-pins are liable to become displaced and the bolts thrown out of position, which has been found to cause serious accidents.

The object of this invention is to produce a bolt which may be as readily inserted as the bolt in ordinary use, but in which the use of cotter-pins may be avoided, for which pins I substitute a locking device permanently connected with the bolt and normally held in its locking position, but which, if desired, may be readily removed from the parts which it holds; and it consists in the construction hereinafter described, and particularly recited in the claims.

A represents the body of the bolt, which is of proper diameter and provided with a flat head B, in the usual manner. Near the outer end is a recess C, which at its inner end extends transversely through the bolt, forming a passage D. The sides of the bolt adjacent to said recess are cut away, as shown in Fig. 1, and so as to form a shoulder $a$ at the outer end and a shoulder $b$ at the inner end. Within the recess is located a latch E, the inner end of which is rounded and formed with a long nose F, which projects into the passage D. Beneath this latch is a bowed spring G, the inner end of which bears on the under side of the said latch near the nose F. This spring and latch are held in position by a cap H, which fits into the notch over the recess and which is formed with shoulders corresponding to the shoulders $a$ $b$, so as to interlock with them and complete the rounded form of pin. This cap is secured to the bolt proper by a rivet I, which not only secures the cap in position, but also holds the spring and latch. When thus secured in position, the spring normally holds the inner end of the latch above the surface of the bolt; but when it is desired to insert the bolt for use it may be forced into its proper position, the spring yielding to allow the latch to pass into the recess and when in position to lift the inner end of the latch above the surface of the lever or part to which it is applied, and so as to securely hold the bolt in position. Should it be desirable to remove the bolt, the inner end of the latch is forced into the recess of the bolt and the rounded inner end of the latch rides upon the inner surface of the hole through which the bolt was inserted, and thus keeps the latch depressed until it is entirely removed, this rounded surface being made necessary by the fact that the bolts usually pass through two or more parts to couple them together, and if the end were not rounded the corner would catch upon one of the inner edges and prevent the withdrawal of the bolt. The passage D provides for the ready escape of sand or dirt which might accumulate in the recess.

I am aware that bolts having spring-latches which may be used in lieu of cotter-pins have been made. Therefore I do not wish to be understood as claiming, broadly, such as my invention; but, Having fully described my invention, what I do claim, and desire to secure by Letters Patent, is—

1. A brake-lever bolt having a recess formed near its outer end, a spring-latch arranged within said recess, and a cap closing the outer end of said recess, and by means of which the spring-latch is secured in said recess, substantially as described.

2. A brake-lever bolt having a recess near its outer end, a transverse opening intersecting said recess, the edges of said recess cut away, a spring-latch arranged within said recess and provided with an inwardly-extending nose which is adapted to enter the transverse opening in the bolt, a cap adapted to close the outer end of said recess and interlock with the shoulders therein, and a rivet extending through said cap and latch and outer end of the bolt, whereby the cap and latch are normally secured in position, substantially as described.

In testimony whereof I have signed this specification in the presence of two subscribing witnesses.

NELS NELSON.

Witnesses:
FRED. C. EARLE,
ELLEN SCARBOROUGH.